United States Patent
Mayer

(10) Patent No.: US 7,123,885 B2
(45) Date of Patent: Oct. 17, 2006

(54) HOUSING THAT AUTOMATICALLY LOCKS INTO A MOUNTING STRUCTURE

(75) Inventor: Werner Mayer, Karlsbad (DE)

(73) Assignee: Harman Becker Automotive Systems, GmbH, Karlsbad (DE)

( * ) Notice: Subject to any disclaimer, the term of this patent is extended or adjusted under 35 U.S.C. 154(b) by 674 days.

(21) Appl. No.: 10/132,074

(22) Filed: Apr. 25, 2002

(65) Prior Publication Data

US 2002/0173280 A1 Nov. 21, 2002

(30) Foreign Application Priority Data

Apr. 25, 2001 (DE) .......................................... 101 20 109

(51) Int. Cl.
*H04B 1/38* (2006.01)

(52) U.S. Cl. .................. 455/90.1; 455/90.3; 455/575.9; 455/575.1; 455/569.2; 455/345; 379/428.01; 379/433.12; 379/433.13; 379/445

(58) Field of Classification Search ................ 455/90.1, 455/90.3, 411, 575.9, 575.1, 569.2, 345; 379/428.01, 433.12, 433.13, 445, 447
See application file for complete search history.

(56) References Cited

U.S. PATENT DOCUMENTS

| | | | | |
|---|---|---|---|---|
| 5,020,748 A | | 6/1991 | Okajima | 248/27.1 |
| 5,339,362 A | * | 8/1994 | Harris | 381/86 |
| 5,438,685 A | * | 8/1995 | Sorensen et al. | 455/575.9 |
| 5,546,273 A | * | 8/1996 | Harris | 361/697 |
| 5,896,564 A | * | 4/1999 | Akama et al. | 455/575.9 |
| 6,320,961 B1 | * | 11/2001 | Hayasaka | 379/433.13 |
| 6,339,699 B1 | * | 1/2002 | Hirai et al. | 455/575.1 |
| 6,655,736 B1 | * | 12/2003 | Arenas | 297/229 |
| 6,742,822 B1 | * | 6/2004 | Vejnar | 296/26.11 |
| 6,745,603 B1 | * | 6/2004 | Shaw | 70/278.1 |

FOREIGN PATENT DOCUMENTS

| | | |
|---|---|---|
| CH | 668583 | 1/1989 |
| DE | 1221322 | 7/1966 |
| DE | 92 06 965 | 9/1992 |
| DE | 30 15 259 | 9/1993 |
| DE | 19614781 | 10/1997 |
| EP | 0963050 | 12/1999 |

* cited by examiner

*Primary Examiner*—Marceau Milord
(74) *Attorney, Agent, or Firm*—O'Shea, Getz & Kosakowski, P.C.

(57) ABSTRACT

Located on the right and left sides of a housing of an automobile radio for example is one detent spring each projecting from the housing, which spring is retractable to enable insertion of the housing into a mounting slot and which, by rotating a catch, is retractable into the housing. By rotating the catches in the other direction of rotation, the detent springs are again released. Disposed eccentrically on the top side of each catch is a pin for which a guide channel is located in the mounting slot so that the housing may be inserted into the mounting slot only with the detent springs projecting from the housing. After complete insertion of the housing into the mounting slot, the detent springs snap in place against detent edges of the mounting slot to lock the housing in place. To remove the housing from the mounting slot, the detent springs are retracted into the housing by rotating the catch. When the housing is pulled out, the pins abut the mounting slot, thereby rotating the catches into the locked position and allowing the pins to slide through the guide channels. After removal from the mounting slot, the detent springs again snap out of the housing into the locked position. The housing may now be reinserted into the mounting slot and automatically locked after compete insertion since the detent springs engage behind the detent edges without any special procedure being required.

20 Claims, 8 Drawing Sheets

HOUSING THAT AUTOMATICALLY LOCKS INTO A MOUNTING STRUCTURE

BACKGROUND OF THE INVENTION

The invention relates to a housing, and in particular to a housing that automatically locks into a mounting structure. The housing may be for an automotive radio, and includes right and left sides on each of which is located one detent spring each projecting from the housing. The spring is retractable into the housing to enable insertion of the housing into a mounting frame or mounting slot, and which snaps in place behind a detent edge of the mounting frame or mounting slot.

German Patent 30 15 259 A1 describes a switchgear cubicle with a slide-in module. Rotatably attached to the slide-in module is a double-armed locking lever, on the front end of which is incorporated a U-shaped opening and on the back end of which is incorporated an indentation. The locking lever is retracted by a spring attached to the slide-in module against a stop located on the slide-in module. Also provided on the slide-in module is a rotary switch with a driving stem which, upon rotation of the rotary switch, engages the U-shaped opening of the locking lever, rotating the locking lever about its axis of rotation. In response to the rotation of the locking lever, its back end along with the indentation is slid through a cut-out in the wall of the switchgear cubicle so that the indentation in the back end of the locking lever snaps into the wall.

Automobile radios, for example, are often equipped with housings that have one detent spring each retractable into the housing on both the right and left sides, which project from the housing and enable insertion into the mounting frame or mounting slot, and which also enable unlocking. German Patents 92 06 965 U1 and 196 14 781 A1 disclose an automobile radio with this type of housing.

The housing is unlocked with a special flat wrench, on one end of which is incorporated an inclination and detent. To enable unlocking, one each of these flat wrenches is introduced on each side into a channel until a catch on the detent spring sliding up the inclination snaps into the detent. As the nose of the detent spring catch slides along the inclination of the flat wrench, the detent spring retracts into the housing. The automobile radio may now be removed from the mounting frame or mounting slot. To install the automobile radio, it is pushed into the mounting frame or mounting slot such that the two detent springs are first pressed into the housing and then expand behind the mounting frame to lock the automobile radio in place.

In the case of the automobile radio disclosed in German Patent 196 14 781 A1, the detent springs are depressed and locked by the flat wrench against detent edges of the mounting slot to ensure secure seating of the housing in the mounting slot.

One disadvantage of this known automobile radio is that its installation and removal require special tools, such as the known flat wrenches.

In addition, the automobile radio should be securely locked in place after insertion in the mounting slot so that in the event of a collision, especially one involving a rear-end collision of the motor vehicle, it is not ejected from the mounting slot and can not act as a projectile that could injure the occupants of the motor vehicle, possibly fatally.

Therefore, there is a need for a housing for installation in a mounting frame or mounting slot whereby the housing automatically locks in place after insertion into the mounting slot, and neither the installation nor the removal of the housing requires special tools.

SUMMARY OF THE INVENTION

One detent spring each projects from the right and left side of the housing, the springs being retractable into the housing to enable insertion of the housing into a mounting frame or mounting slot. Provided in the mounting frame or mounting slot on the right and left side adjoining the left and right side of the housing is one detent edge each, behind which the detent springs snap in place after the housing has been completely inserted, to ensure that the housing locks in place within the mounting frame or mounting slot.

Located on the right or left side of the housing is one rotatable catch each with an oblique guide against which a stop of the tensioned detent spring presses. Rotating the catch in one direction, preferably to the left, enables the detent springs to retract into the housing. Rotating the catch in the other direction, preferably to the right, enables the detent springs to release. The housing is unlocked when the detent springs are retracted into the housing, whereas it is locked when the detent springs project out of the housing.

A pin is located eccentrically on the top side of each locking bar, the position of the pin indicates whether the detent springs are retracted in the housing in the unlocked position or are projecting from the housing in the locked position.

Located on the right and left in the mounting frame or mounting slot is a guide channel each for the pin of the catch to allow the housing to be slid into the mounting frame or mounting slot only in the locked position (i.e., when the detent springs project from the housing). When the housing is inserted into the mounting frame or mounting slot, the detent springs are pressed into the housing and snap in place, after successful insertion, behind the detent edges so that the housing is locked in place within the mounting frame or mounting slot.

To remove the housing from the mounting frame or mounting slot, the detent springs are moved to the unlocked position by rotating the catch to the left, in which position they are retracted within the housing. The housing may then only be pulled out from the mounting frame or mounting slot to the point where the pins of the catch abut the mounting frame or mounting slot. By pulling the housing out further, the catches are rotated until the pins slide into the guide channels provided for them. At the same time the detent springs are released but remain retracted in the housing by the mounting frame or mounting slot while snapping into the locked position after removal from the mounting frame or mounting slot.

An advantage of the invention is that the detent springs are automatically situated in the locked position after the housing is removed from the mounting frame or mounting slot so that the housing is automatically locked when reinserted into the mounting frame or mounting slot. As a result, no manual locking of the housing is required after insertion into the mounting frame or mounting slot.

Automatic locking ensures that the housing is automatically secured in the mounting frame or mounting slot, and as a result the locking procedure is not overlooked and the housing cannot be ejected from the slot during a collision. With any housing that has been completely inserted into the mounting frame or mounting slot, its locking state is automatically ensured.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
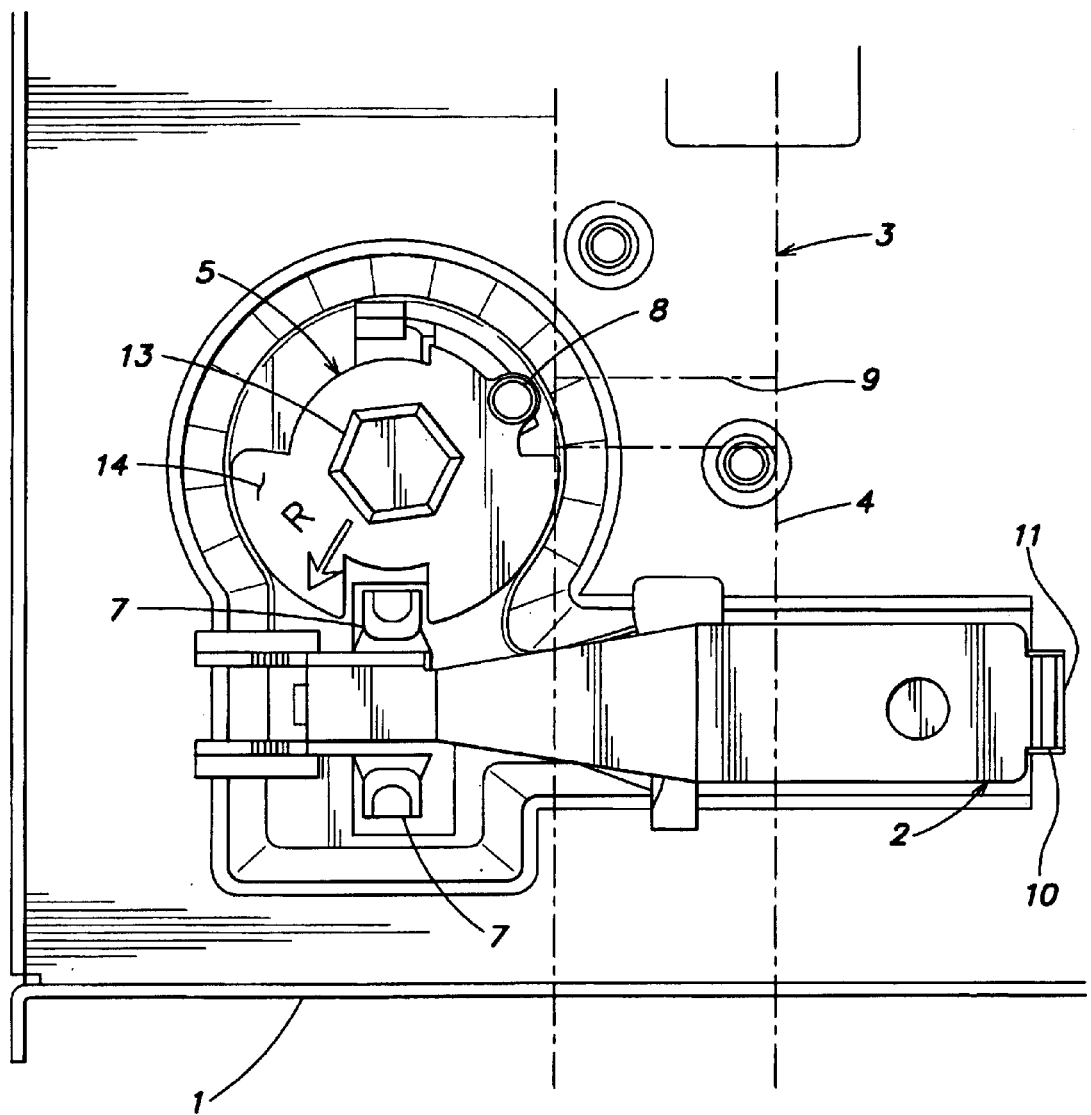
FIG. 1 is a partial view of the right side of a housing with a catch and a detent spring in the locked position before insertion into a mounting slot.

FIG. 1 provides a partial view of the right side of a housing 1 with a catch 5 and a detent spring 2 in the locked position before insertion into mounting slot 3. A pin 8 is located eccentrically on the top side of the catch 5 and, in the locked position shown here, is slidable into a guide channel 9 of the mounting slot 3.

A tongue 10 is provided on the back end of the detent spring 2 to fit into a slot 11 of the housing 1. A stop 7 is located on the front end of the detent spring 2 on both the right and left sides. When the catch 5 is rotated to the left, one of the two stops 7 rests on a hidden oblique guide 6 (shown in FIG. 4). Also provided on the front end of the detent spring 2 are two forward-tilted detent arms 16 that snap in place behind a detent edge 4 of the mounting slot 3.

After insertion of the housing 1 into the mounting slot 3, the detent arms 16 of the detent spring 2 snap in place against the detent edge 4 of the mounting slot 3, thereby locking the housing 1 in place within the mounting slot 3.

To show all the components of the housing 1, the catch 5 and the detent spring 2, the mounting slot 3 is drawn transparently.

Figure 2:
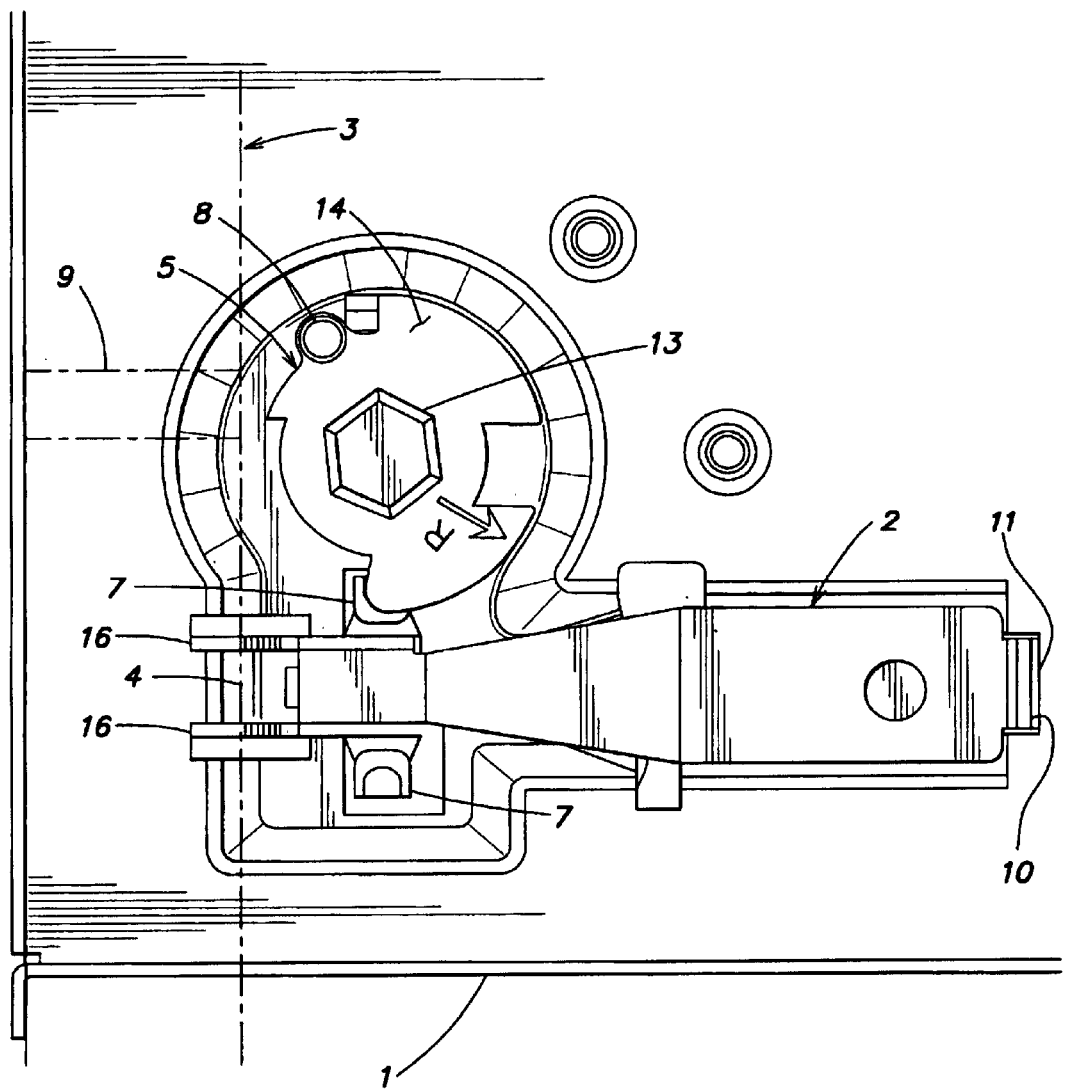
FIG. 2 is a partial view of the right side of the housing of FIG. 1, inserted into the mounting slot in the unlocked position.

FIG. 2 provides a partial view of the right side of the embodiment in FIG. 1 with the catch 5 and the detent spring 2 inserted into the mounting slot 3.

To release the detent spring 2 engaged behind the detent edge 4, the catch 5 is rotated to the left with the pin 8 into the unlocked position in which the detent springs 2 are retracted within the housing 1.

Since in the unlocked position the detent springs 2 are retracted within the housing 1, the housing may be pulled out of the mounting frame 3 until the pin 8 abuts the mounting frame 3. By withdrawing the housing 1 further from the mounting slot 3, the catch 5 is rotated to the right, due to the pin 8 striking the mounting slot, until the pin 8 slides into the guide channel 9 of the mounting slot 3 provided for the pin. At the same time the detent spring 2 is again released but can no longer engage, since it is now located in the opening of the mounting slot 3.

When the housing 1 has been pulled further out from the mounting slot, it is in the position shown in FIG. 1. The detent spring 2 projects from the housing 1 and is thus in the locked position. When the housing 1 is pushed back into the mounting slot 3, the housing is automatically locked after complete insertion since the detent springs 2 again engage behind the detent edge 4 of the mounting slot 3.

Figure 3:
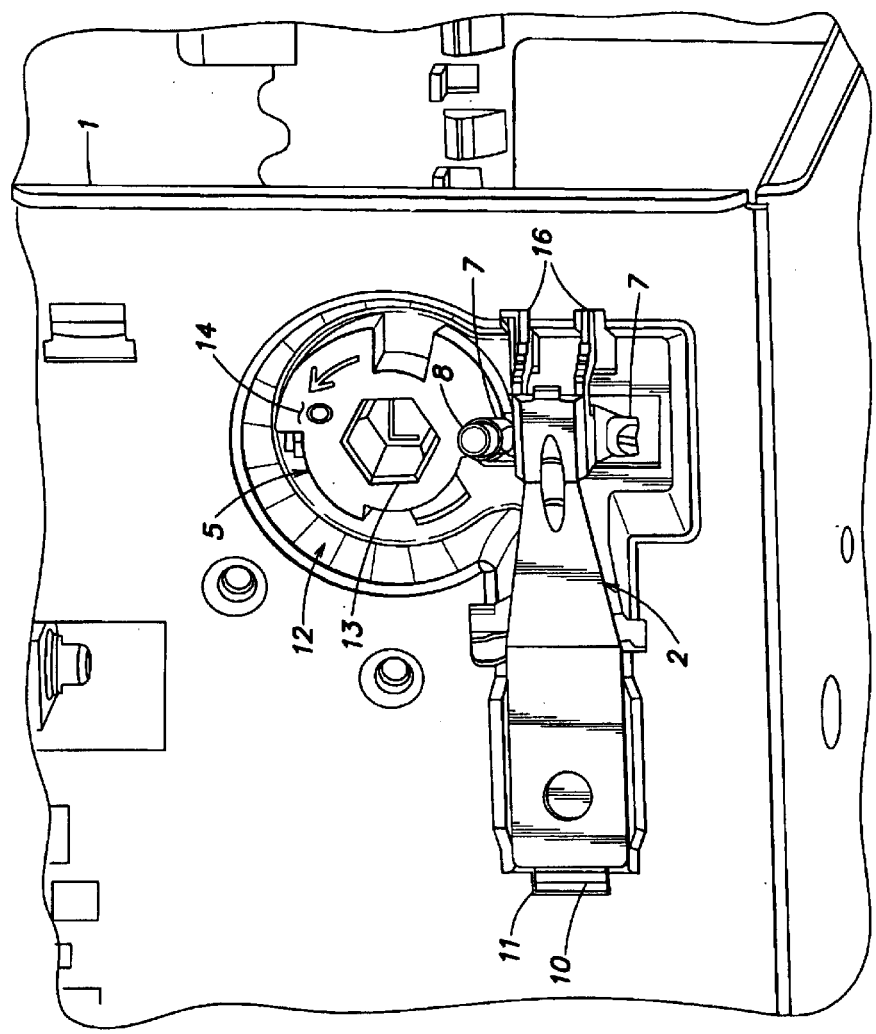
FIG. 3 is a partial view of the left side of the housing with a catch and a detent spring in perspective view.

FIG. 3 provides a partial view of the left side of the housing 1 with the catch 5 and the detent spring 2 in perspective view. The catch 5 is rotatably supported in an opening 12 of the housing 1. A hexagonal hole 13 is aligned concentrically with the rotational axis of the catch 5 to accommodate a hexagonal wrench. The pin 8 is disposed eccentrically on the top side 14 of the catch 5. The tongue 11 on the back end of the detent spring 2 inserts into the slot 10 of the housing 1. Disposed on the front end of the detent spring 2 are the two opposing stops 7.

Figure 4:
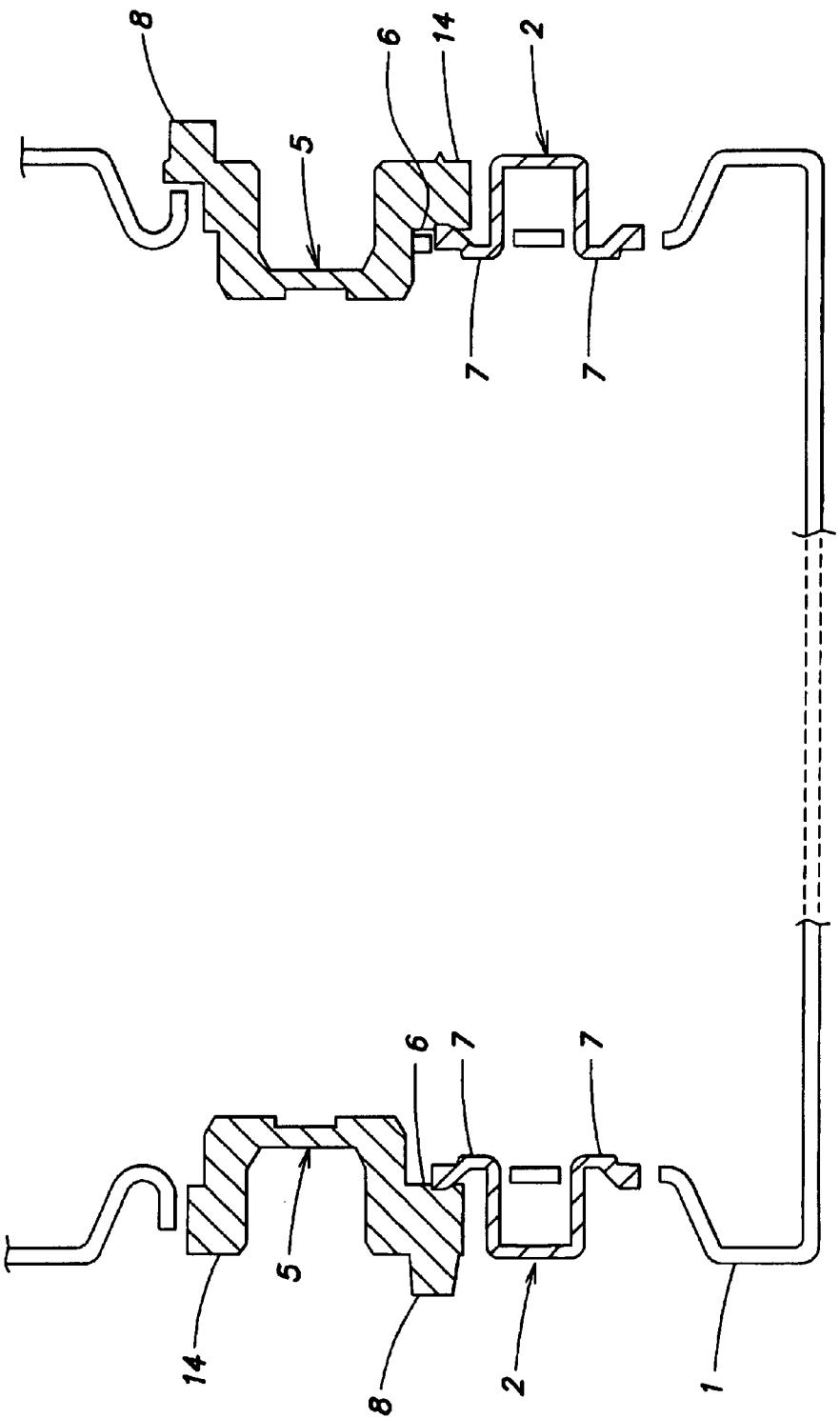
FIG. 4 is a partial section through the left and right sides of the housing, with the catch and detent springs in the unlocked position.

FIG. 4 is a partial section through the left and right side of the housing 1 with the left catch 5 and left detent spring 2 in the unlocked position. The one stop 7 of the detent spring 2 rests on the oblique guide 6 of the catch 5. In the unlocked position shown in FIG. 4, the oblique guide 6 holds the detent spring 2 in the retracted position within the housing 1.

Figure 5:
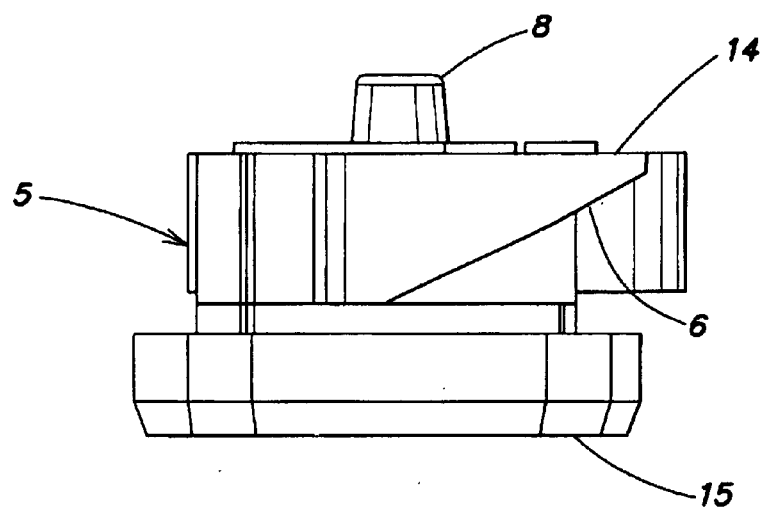
FIG. 5 is a side view of an embodiment of a right catch.

FIG. 5 provides a side view of the right catch. The pin 8 is disposed eccentrically on the top side 14 of the catch 5. The oblique guide 7 is incorporated on the casing of the disk-shaped catch 5, extending along an approximately quarter-turn segment, to accommodate the stop 7 of the detent spring 2. The bottom side of the left catch 5 is designated as reference 15.

Figure 6:
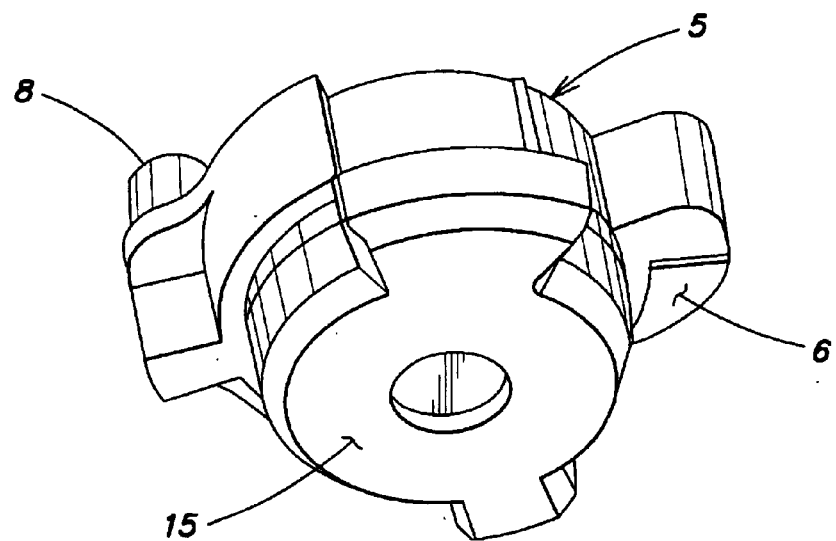
FIG. 6 illustrates a perspective view of the right catch.

FIG. 6 shows the right catch 5 with the pin 8, the oblique guide 6, and the bottom side 15 from below in perspective view.

Figure 7:
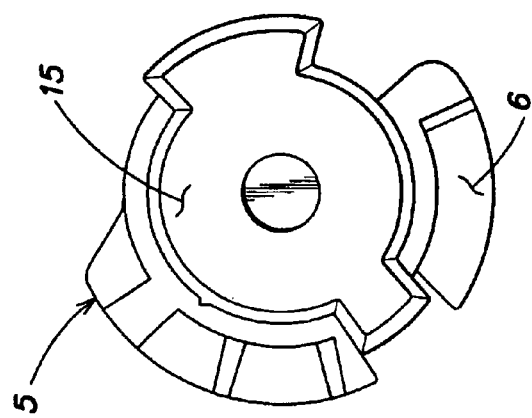
FIG. 7 illustrates an embodiment of the left catch from below.

FIG. 7 reveals a left catch with its bottom side 15 as seen from below.

Figure 8:
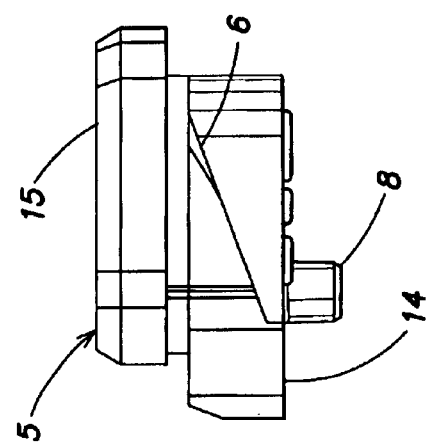
FIG. 8 is a side view of the left catch.

FIG. 8 shows the left catch 5 with the pin 8 on its top side 14, the bottom side 15, and oblique guide 6 on the casing of disk-shaped catch 5.

Figure 9:
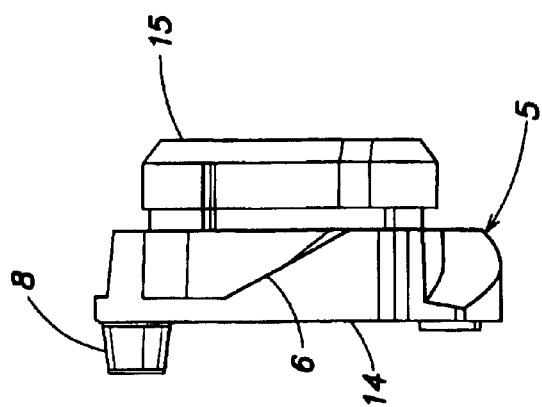
FIG. 9 is another side view of the left catch.

FIG. 9 is another side view of the left catch with the top side 14, the pin 8, and the bottom side 15.

Figure 10:
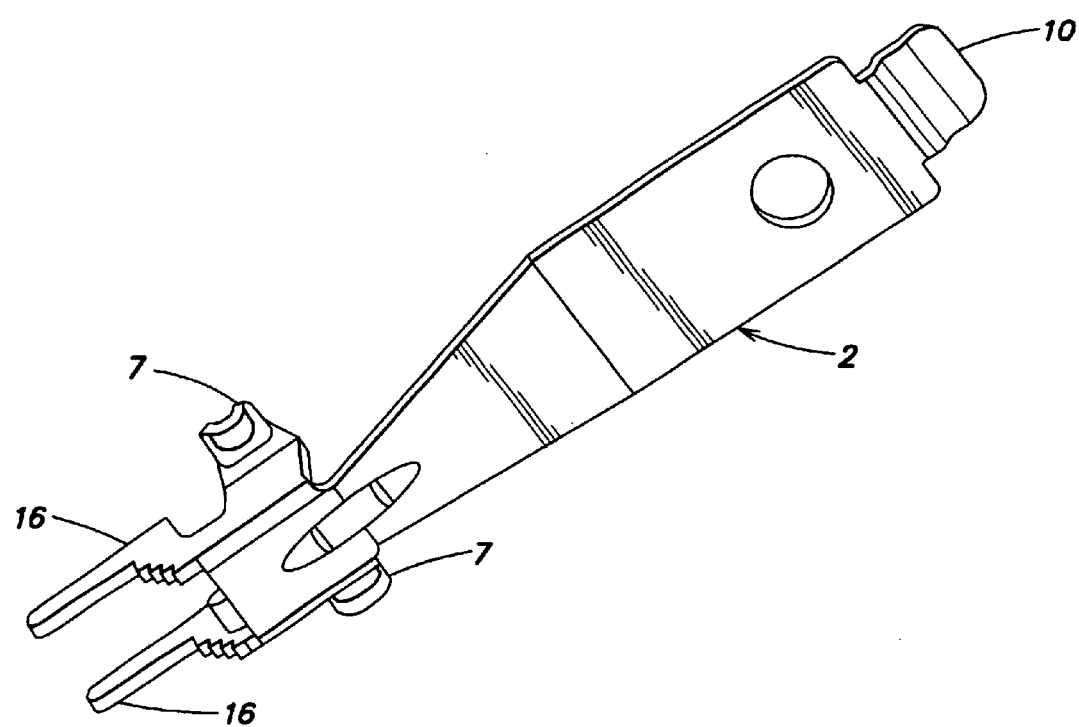
FIG. 10 illustrates an embodiment of a detent spring in perspective view.

FIG. 10 is a perspective view of the detent spring 2. A tongue 10 is provided on the back end of the detent spring 2, and fits into slot 11 (FIG. 1) in the housing. The two opposing stops 7 are disposed on the front end of the detent spring 2. In addition, the front end of the detent spring 2 has two forward-tilted detent arms 16. The detent springs 2 are of symmetrical design, the left and the right detent spring being identical.

Figure 11:
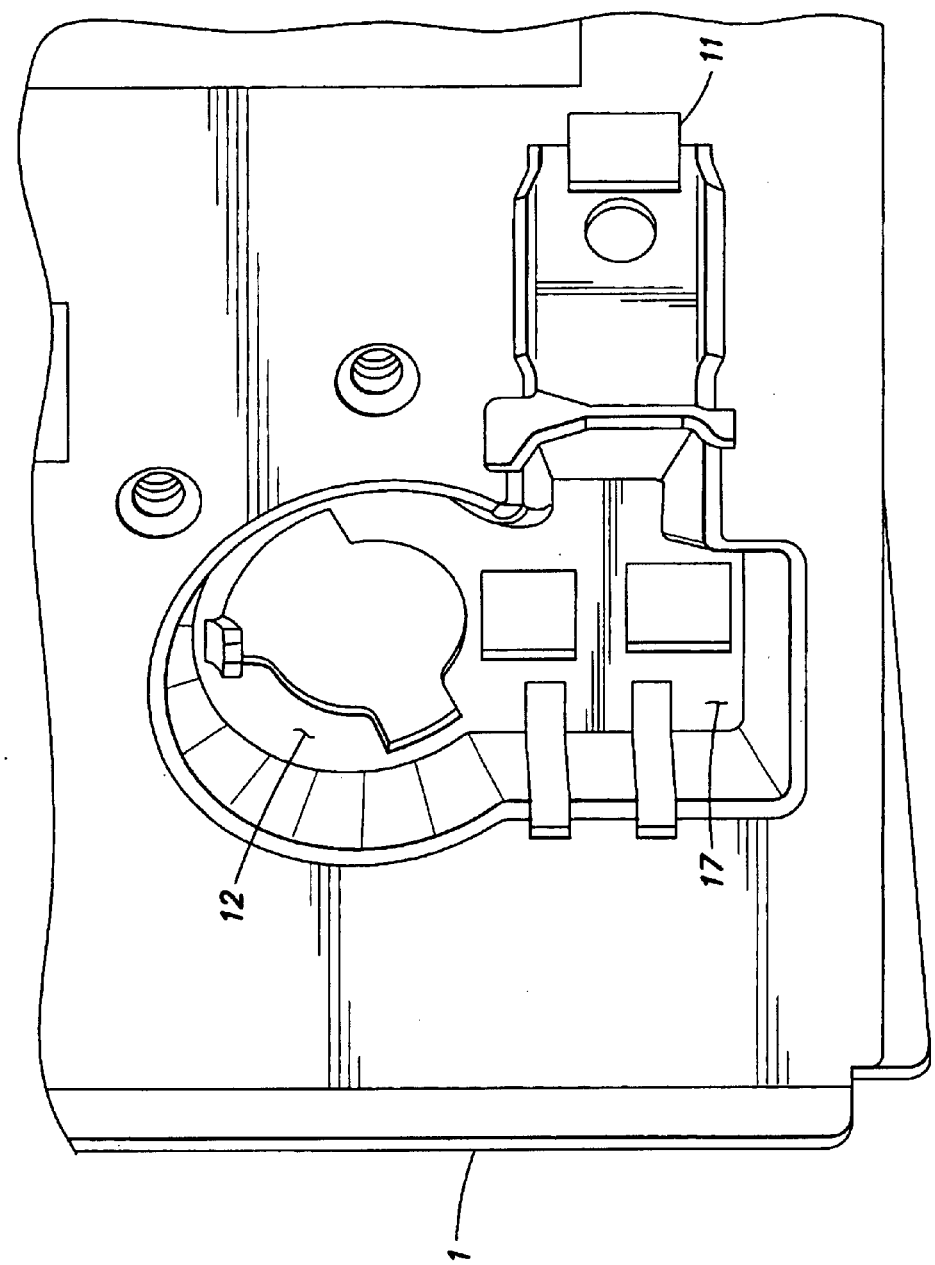
FIG. 11 a partial view of the right side of the housing without catch and detent spring in perspective view.

FIG. 11 provides a partial view of the right side of the housing without the catch and detent springs, in perspective view. An opening 12 for rotatable mounting of the catch 5 is incorporated in the right side of the housing 1 as well as in the left side. As mentioned above, the slot 11 is also provided into which the tongue 10 of the detent spring 2 is inserted. A recess 17 in which detent spring 2 retracts is also provided.

The housing is especially suited for an automobile radio. An advantage of the housing is that after complete insertion into the mounting slot, the housing is automatically secured and locked in place. No additional procedures are required to secure the housing. This ensures that once the housing is inserted into a mounting slot, the housing remains securely locked in place.

Although the housing may be used for an automobile radio, one of ordinary skill will recognize that the present invention may also be used for automobile components such as automotive navigation and multimedia components. In addition, the invention is of course not limited to use in motor vehicles (e.g., car, trucks, planes, etc). It is contemplated that the automatic locking arrangement of the present invention may also be used in housings other than those used in motor vehicles, since it would be desirable to automatically lock the inserted housing.

Although the present invention has been shown and described with respect to several preferred embodiments thereof, various changes, omissions and additions to the form and detail thereof, may be made therein, without departing from the spirit and scope of the invention.

What is claimed is:

1. A housing, comprising on right and left sides of the housing one detent spring each projecting from the housing, which springs are retractable into the housing to enable insertion of the housing into a mounting frame or mounting slot and which snaps in place behind a detent edge of the mounting frame or mounting slot,
   where, disposed on the right and left sides of the housing, is one rotatable catch each with an oblique guide against which a stop of the detent spring under tension presses; that the detent springs are retracted into the housing by rotating the catch in one direction, while they are released by rotating the catch in the other direction; that an eccentrically disposed pin projects from each catch, for which pin a guide channel is located in the mounting frame or mounting slot so that the housing may be inserted into the mounting frame or mounting slot only in the locked position with the detent springs projecting from the housing, the detent springs being pressed into the housing and snapping in place behind the detent edges after successful insertion; that to remove the housing from the mounting frame or mounting slot, the detent springs are moved into the unlocked position by rotating the catch, in which position they are retracted within the housing; that when the housing is pulled out from the mounting frame or mounting slot, the pins of the catches abut the mounting frame or mounting slot so that the catches are rotated to the point where the pins slide into the guide channels provided for them, the detent springs being simultaneously released and thus snapping into the locked position from the housing immediately upon removal from the mounting frame or mounting slot.

2. The housing of claim 1, where a tongue is provided on the fastening end of the detent springs, the tongue being insertable into a slot of the housing.

3. The housing of claim 2, where provided on the end of the detent springs projecting from the housing on the right and left sides, is one stop each which slides along the oblique guide of the catch.

4. The housing of claim 3, wherein the end of the detent springs projecting from the housing, two detent arms project in the longitudinal direction of the detent springs.

5. The housing of claim 4, where the catch is of a disk-shaped design.

6. The housing of claim 5, wherein each of the two catches is insertable into an opening in the housing in which the catch is rotatably mounted.

7. The housing of claim 6, where the oblique guide for the stop of a detent spring is incorporated into the casing of the catch.

8. The housing of claim 7, where the oblique guide extends approximately one-fourth of a segment of a circle.

9. The housing of claim 8, where the detent springs are lockable by rotating the catches to the right and project from the housing, while by rotating the catches to the left they are unlockable and retract within the housing.

10. The housing of claim 9, where the rotatable catches have a device for engaging a conventional tool.

11. The housing of claim 10, where the rotatable catches have a slot for the engagement of a screwdriver, a recess for the engagement of a torque screwdriver, a hexagonal head for the engagement of a wrench, or a hexagonal hole for the engagement of a hexagonal wrench.

12. The housing of claim 11, where the housing is the housing of an automobile radio.

13. A housing adapted to be selectively inserted into and withdrawn out from a mounting frame or mounting slot, the housing comprising:
   at least one assembly that engages the mounting slot as the housing is selectively inserted into and withdrawn out from the mounting frame or mounting slot;
   the assembly including a detent spring and a catch, the detent spring adapted to be moveable into and out of a frist corresponding location in the housing, the catch adapted to be moveable within a second corresponding location in the housing and to interact with the detent spring;
   where the catch includes a guide surface and a protrusion, and where the detent spring includes a stop, the guide surface of the catch being adapted to interact with the stop of the detent spring, the protrusion of the catch being adapted to interact with a corresponding channel of the mounting frame or mounting slot;
   where when the housing is selectively inserted into the mounting frame or mounting slot the detent spring is moved into the first corresponding location within the housing upon movement of the catch in a first direction, and after insertion of the housing into the mounting frame or mounting slot the detent spring is engaged with a corresponding detent location of the mounting frame or mounting slot; and
   where when the housing is selectively withdrawn out frome the mounting frame or mounting slot the detent spring is moved out of the first corresponding location in the housing upon initiation of movement of the catch in a second direction, the protrusion of the catch moves within the corresponding channel of the mounting frame or mounting slot, and upon complete withdrawal of the housing from the mounting frame or mounting slot, the detent spring is engaged with the corresponding detent location of the mounting frame or mounting slot.

14. The housing of claim 13, comprising at least two of the assemblies, where the housing comprises opposing facing sides, and where a first assembly of the at least two assemblies is adapted to engage a first one of the opposing facing sides, and where a second assembly of the at least two assemblies is adapted to engage a second one of the opposing facing sides.

15. The housing of claim 13, where the catch is adapted to be rotatable within the second corresponding location in the housing in at least two different directions of rotation.

16. The housing of claim 13, where the protrusion of the catch further comprises a pin that is eccentrically disposed on a first surface of the catch, the pin being adapted to interact with the corresponding channel of the mounting frame or mounting slot.

17. The housing of claim 13, where the guide surface of the catch comprises an angled surface that is in contact with the stop of the detent spring, where movement of the catch in the first direction causes a corresponding movement of the detent spring into the first corresponding location within the housing, and where movement of the catch in the second direction causes a corresponding movement of the detent spring out of the first corresponding location within the housing.

18. A housing adapted to be selectively inserted into and withdrawn out from a mounting frame or mounting slot, the housing including first and second opposing facing sides, the housing comprising:

first and second assemblies, each of the first and second assemblies being adapted to engage the mounting frame or mounting slot as the housing is selectively inserted into and withdrawn out from the mounting frame or mounting slot, where the first assembly is adapted to engage the first opposing facing side, and where the second assembly is adapted to engage the second opposing facing side;

each of the first and second assemblies including a detent spring and a catch, each of the detent springs adapted to be moveable into and out of a first corresponding location in the housing, each of the catches adapted to be rotatable in at least two different directions of rotation within a second corresponding location in the housing and to interact with the detent spring;

where the catch includes a guide surface and a protrusion, and where the detent spring includes a stop, the guide surface of the catch being adapted to interact with the stop of the detent spring, the protrusion of the catch being adapted in interact with a corresponding channel of the mounting frame or mounting slot;

where when the housing is selectively inserted into the mounting frame or mounting slot the detent spring is moved into the first corresponding location within the housing upon movement of the catch in a first direction, and after insertion of the housing into the mounting frame or mounting slot the detent spring is engaged with a corresponding detent location of the mounting frame or mounting slot; and where when the housing is selectively withdrawn out from the mounting frame or mounting slot the detent spring is moved out of the first corresponding location in the housing upon initiation of movement of the catch in a second direction, the protrusion of the catch moves within the corresponding channel of the mounting frame or mounting slot, and, upon complete withdrawal of the housing from the mounting frame or mounting slot, the detent spring is engaged with the corresponding detent location of the mounting frame or mounting slot.

19. The housing of claim 18, where the protrusion of the catch further comprises a pin that is eccentrically disposed on a first surface of the catch, the pin being adapted to interact with the corresponding channel of the mounting frame or mounting slot.

20. The housing of claim 18, where the guide surface of the catch comprises an angled surface that is in contact with the stop of the detent spring, where rotation of the catch in the first direction causes a corresponding movement of the detent spring into the first corresponding location within the housing, and where rotation of the catch in the second direction causes a corresponding movement of the detent spring out of the first corresponding location within the housing.

* * * * *

UNITED STATES PATENT AND TRADEMARK OFFICE
CERTIFICATE OF CORRECTION

PATENT NO. : 7,123,885 B2 Page 1 of 1
APPLICATION NO. : 10/132074
DATED : October 17, 2006
INVENTOR(S) : Werner Mayer It is certified that error appears in the above-identified patent and that said Letters Patent is hereby corrected as shown below:

Column 5
In the claims, claim 1, line 19, after "housing" and before "one" insert --,--
In the claims, claim 4, line 57, delete "3, wherein" and insert --1, where--
In the claims, claim 6, line 62, delete "5" and insert --1--

Column 6
In the claims, claim 12, line 13, delete "11" and insert --1--
In the claims, claim 13, line 18, after "mounting" insert --frame or mounting--
In the claims, claim 13, line 24, delete "frist" and insert --first--
In the claims, claim 13, line 43, delete "frome" and insert --from--

Column 7
In the claims, claim 18, line 34, after "adapted" delete "in" and insert --to--

Signed and Sealed this

Twenty-sixth Day of December, 2006

JON W. DUDAS
*Director of the United States Patent and Trademark Office*